(12) United States Patent
Kiselovs

(10) Patent No.: US 10,018,176 B2
(45) Date of Patent: Jul. 10, 2018

(54) SYSTEM COMPRISING A VERTICAL TURBINE WITH FLOW GUIDES

(71) Applicants: Girts Filipovs, Riga (LV); Jurijs Kiselovs, Dobele (LV)

(72) Inventor: Jurijs Kiselovs, Dobele (LV)

(73) Assignees: Girts Filipovs, Riga (LV); Jurijs Kiselovs, Dobele (LV)

( * ) Notice: Subject to any disclaimer, the term of this patent is extended or adjusted under 35 U.S.C. 154(b) by 184 days.

(21) Appl. No.: 14/779,304

(22) PCT Filed: Mar. 21, 2014

(86) PCT No.: PCT/LV2014/000004
§ 371 (c)(1),
(2) Date: Sep. 22, 2015

(87) PCT Pub. No.: WO2014/148879
PCT Pub. Date: Sep. 25, 2014

(65) Prior Publication Data
US 2016/0053743 A1    Feb. 25, 2016

(30) Foreign Application Priority Data
Mar. 22, 2013   (LV) .................................. P-13-37

(51) Int. Cl.
*F03D 3/04* (2006.01)
*F03D 9/25* (2016.01)
(Continued)

(52) U.S. Cl.
CPC ............. *F03D 3/04* (2013.01); *F03B 3/12* (2013.01); *F03B 3/18* (2013.01); *F03B 13/00* (2013.01);
(Continued)

(58) Field of Classification Search
CPC ...... F03D 3/0463; F03D 3/049; F03D 3/0481; F03D 3/0472; F03D 3/0436; F03D 3/0454
See application file for complete search history.

(56) References Cited

U.S. PATENT DOCUMENTS 1,315,595 A * 9/1919 Clark .................... F03D 3/0472
244/103 S
1,413,411 A * 4/1922 Gardiner ............... F03D 3/0454
415/156
(Continued)

FOREIGN PATENT DOCUMENTS

AU      2005203573       2/2006
BE          1009775 A6 *  8/1997 ............. F03D 3/002
(Continued)

OTHER PUBLICATIONS

FR2300235, Specification English Translation, Espacenet.*

*Primary Examiner* — Richard Edgar
*Assistant Examiner* — John S Hunter
(74) *Attorney, Agent, or Firm* — Blank Rome LLP

(57) ABSTRACT

Vertical electrical energy generators are described. A vertical wind turbine system contains one or two vertical turbines, paired aside each other, and a frontal fluid flow diverter for diverting of the running fluid flow, as well as a cover, which covers the upper part of the turbine(s). The system includes an additional rear fluid flow diverter, which is installed behind one or both turbines and is configured so as to divert fluid flow running above the cover to the rear part of the turbine(s), creating secondary fluid flow in the blades of the turbine(s).

5 Claims, 7 Drawing Sheets

(51) Int. Cl.
 *F03D 3/00* (2006.01)
 *F03B 3/12* (2006.01)
 *F03B 3/18* (2006.01)
 *F03B 13/00* (2006.01)

(52) U.S. Cl.
 CPC .......... *F03D 3/005* (2013.01); *F03D 3/0436* (2013.01); *F03D 3/0454* (2013.01); *F03D 9/25* (2016.05); *F05B 2240/13* (2013.01); *Y02E 10/74* (2013.01)

(56) References Cited

U.S. PATENT DOCUMENTS

| | | | |
|---|---|---|---|
| 4,017,204 A | | 4/1977 | Sellman |
| 4,156,580 A | | 5/1979 | Pohl |
| 4,191,505 A | * | 3/1980 | Kaufman ............... F03D 3/0463 415/101 |
| 5,332,354 A | | 7/1994 | Lamont |
| 7,488,150 B2 | | 2/2009 | Krippene |
| 8,052,372 B1 | * | 11/2011 | Dvorak ................. F03D 3/0454 415/2.1 |

FOREIGN PATENT DOCUMENTS

| | | | |
|---|---|---|---|
| BY | 7594 C1 | 12/2005 | |
| DE | 10 2004 060 230 | 6/2006 | |
| FR | 2300235 A1 * | 9/1976 | ............... F03D 3/02 |
| JP | 52-1251 | 1/1977 | |
| JP | S52 1251 | 1/1977 | |
| JP | 1 193 084 | 8/1989 | |
| JP | 1-193084 | 8/1989 | |
| RU | 2 472 031 C1 | 1/2013 | |

\* cited by examiner

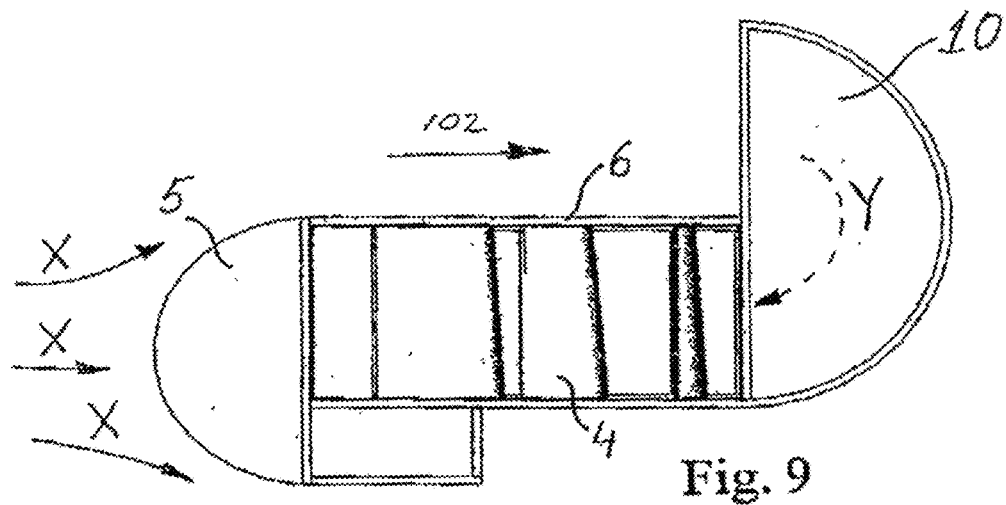
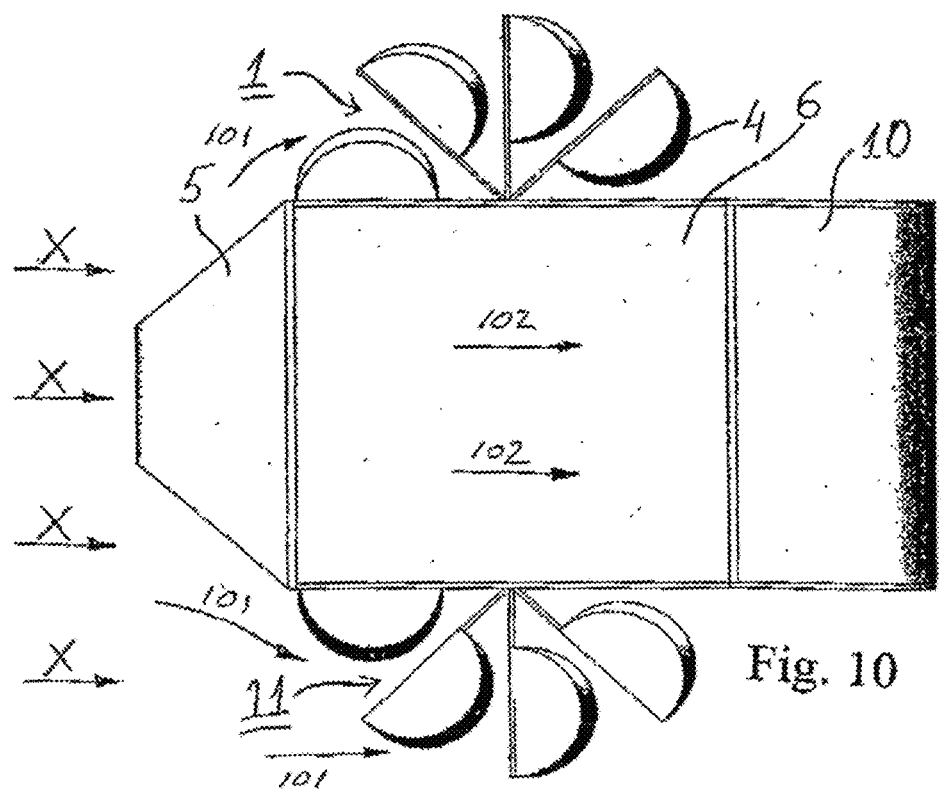

SYSTEM COMPRISING A VERTICAL TURBINE WITH FLOW GUIDES

TECHNICAL FIELD

The present disclosure refers to vertical electrical energy generators, mainly, to vertical generators with the diverters of flow. The indicated generator can function in various environments—in the air or in water.

BACKGROUND ART

The present technical level offers vertical wind generators. The vertical wind generator stands for the most typical variant, containing a vertical rack or axis, onto which a rotator is attached by montage, on which the blades are posited, in turn.

One of the most significant problems observed in vertical wind generators is the fact that that only one half of the rotator blades performs useful work. The other part circles opposite the direction of wind and impairs the rotator. Thus, the wind generator's efficiency is reduced.

In order to solve this problem, vertical wind generators are offered where the part performing the motion countering the direction of wind gets covered with wind diverter. Accordingly, the flow of wind hits only those blades of wind generator, which perform useful work.

This kind of solution is described in U.S. Pat. No. 4,017,204 where the part of the rotator, which is turned against the direction of wind, gets covered. The flow of wind is diverted either away from the turbine or to that part of the turbine, in which the blades rotate in the direction of wind.

A model of vertical wind generators exists, which contains two turbines and in which the previously indicated approach of covering the reversely rotating part is in force. Accordingly, in front of both turbines, placed among them, the diverter of wind is situated. Such solutions are described in the U.S. Pat. No. 4,156,580 and in Japanese patent application No. JP 1193084 A.

Besides, a vertical wind generator with a profiled influx channel is described in the U.S. Pat. No. 7,488,150 B. A sail-like air flux diverter is placed above the wind turbine, which diverts the wind flow passing above the turbine to the upper part of the turbine. The indicated wind flow enters perpendicular to movement of blades, which significantly reduces the efficiency of the diverted flow or even shuts it down completely.

A vertical wind generator is described in Australian patent No. AU 2005203573 B2, which contains a single vertical turbine, which is entirely sealed. Turbine is open at the part of influx of wind and at the part of the outflow of wind. Additionally, a wind diverter is placed in the upper part of the vertical turbine, which diverts the air, which flows above, in the turbine, perpendicularly to the direction of movement of blades. The indicated wind diverter is envisioned for limiting the speed of rotation, as the flow entering perpendicularly to the blades slows down the function of turbine.

SUMMARY

An aim of this disclosure is to build a vertical generator or a system of vertical turbine, which would use entire vertical turbine for useful work, thus, constructing a more effective generator, i.e., a generator with higher index of efficiency.

The indicated aim is achieved by constructing a system of vertical turbine, which contains such kind of main elements as a vertical turbine, the frontal fluid flow diverter for diverting of the flow and a rear fluid flow diverter, which is envisioned for diverting of the fluid flow in the rear part of turbine, creating a secondary fluid flow. The secondary fluid flow flows inside the generator reverse to the main fluid flow, creating additional useful work for the turbine blades.

The wind flow or water flow is indicated as fluid flow in this disclosure. Accordingly, it is specified that said system is able to function in the air, as a vertical wind turbine system, or in water, as a water flow turbine system. Accordingly, said system can be used in rivers, seas, and other water holds where flow of water can be observed.

The vertical turbine contains a vertical axis, on which rotor is installed, on which blades are positioned. The blades are construed to be able to receive the fluid flow directed at them.

Vertical turbine system containing a cover, which is installed on top of the turbine, at least partly covering it from above; additionally, it has a frontal fluid flow diverter built into it, for diverting of the main fluid flow. It is placed inside of the turbine and partly covers it. Besides, the frontal fluid flow diverter is configured in such a mode as to divert the main fluid flow to the sides, towards the uncovered blades of the turbine and above the cover as well as under the turbine. The vertical turbine system contains, in addition, a rear fluid flow diverter, which is placed behind the turbine and which is configured in such a way as to divert the fluid flow, which runs over the cover, to the rear part of the turbine, creating a secondary flow in the turbine blades.

Also, a variant is possible where the system contains two turbines positioned next to each other. The only difference from the system with a single turbine is presence of two turbines. Two turbine system presents, in a way, a mirror view of single turbine system.

Vertical turbine system, which contains, additionally, two closely paired vertical turbines, similar as in the case of single turbine system, contains a cover placed over the turbines, at least partly covering them from above. Frontal fluid flow diverter for diverting of main fluid flow, which is placed on the frontal part of both turbines and partly covers each of the indicated turbines. To add, the frontal fluid flow diverter is configured so as to divert the indicated main fluid flow to both sides, towards the uncovered turbine blades and above the cover, as well as under the turbines. It also contains a rear fluid flow diverter placed behind the pair of turbines and configured so as to divert the fluid flow running above the cover to the rear part of the turbine, creating secondary fluid flow in the turbine blades.

Besides, the vertical axes of turbines against the horizontal plane can be inclined from 0 to 10 degrees, preferable, from 0 to 5 degrees. The value of inclination is determined by the secondary fluid flow running from the rear fluid flow diverter. It is advisable for the secondary fluid flow to be parallel to direction of the rotation of turbine blades.

A variant is possible where those to be inclined are turbine blades rather than the vertical axis of the turbine. In this case, the turbine axis is perpendicular to horizontal plane, but the blades are inclined from 0 to 10 degrees, preferable, from 0 to 5 degrees. Likewise, in this case, the value of inclination is determined by the secondary fluid flow running from the rear fluid flow diverter.

Frontal fluid flow diverter for diverting of main fluid flow is placed in frontal part of one or both of the turbines and partly covers each of said wind turbines. Partly covering includes covering of the turbine on one side of its axis. In addition to that, the part indicated as frontal is the part, which comes into contact with the fluid flow hitting it first, specifically, the main fluid flow. Besides, the frontal diverter is configured so as to divert the indicated main fluid flow to the side, towards turbine blades and above the cover, as well as under the turbines. Turbines placed on each side are situated so as the fluid running along the side, i.e., the fluid flow distributed on the blades situated on each side, is equal.

Characteristic for the turbine system is that it comprises, in addition, a rear diverter, which is placed behind one or both of the turbines. Rear diverter is configured so as to divert the main fluid flow running above one or both of the turbines, to the rear part of the turbines, creating secondary fluid flow in turbine blades. It is precisely the existence and configuration of rear diverter, which ensures that wind turbine functions fully, as all turbine blades are employed.

Besides, in case of two co-existing turbines, the rear diverter is configured so as the main fluid flow is diverted to the rear part of turbines between the vertical axes of both turbines, creating secondary fluid flow onto the blades inside of the vertical turbine system. The secondary fluid flow runs, essentially, parallel to direction of blade rotation and counter to main fluid flow.

A solution is possible, where the rear fluid flow diverter comprises flow driving blades, which help to divert, fluently, the fluid flow entering the rear fluid flow diverter to the rear of the turbines, creating the secondary fluid flow.

In addition, the rear fluid flow diverter comprises a protrusion on its lower part, which extends under the turbines, covering them, at least in part. Variations are possible, in which said protrusions extend under the turbine or—axes of turbines, or above them, or ends prior to reaching them.

Above the turbine or turbines a cover is placed, which covers them, at least in part, from above. In addition, the upper cover is connected to the indicated frontal fluid flow diverter and extends as far as till the rear fluid flow diverter. Thus, the flow diverted upwards from the frontal fluid flow diverter runs over the cover to the rear fluid flow diverter. The fluid flow running above the cover enters the rear fluid flow diverter where it passes into secondary fluid flow.

In addition, the frontal diverter is configured so as to cover the zone between the vertical axes of both of the turbines, in order for the main fluid flow to be diverted only to the blades placed on the outer part of both wind turbines and above the turbines. One of the variations permits that the frontal wind diverter is protuberant downwards from turbine or turbines, thus, covering the lower part of the system, which contains additional lower side walls and lower cover.

The frontal diverter is constructed so as to divert the secondary fluid flow, which runs through the turbines, downwards from turbines, i.e., outside of the system.

Both diverters of fluid flow are configured, by their form and construction, so as the potential of the lateral fluid flow (flows) running on the outer limit along one (in case of single turbine) or both sides (in case of two turbines) would be equal with the secondary fluid flow. Accordingly, the potential of fluid flows running onto outer blades is equal with the potential of fluid flows running onto inner blades.

BRIEF DESCRIPTION OF THE DRAWINGS

The added drawings illustrate examples of technical solutions where each figure illustrates the following:

FIG. 9 illustrates the principal scheme of vertical turbine system by side view;

FIG. 10 illustrates system of vertical turbines in its view from above;

EXAMPLES OF PREFERABLE EMBODIMENTS

Figure 1A:
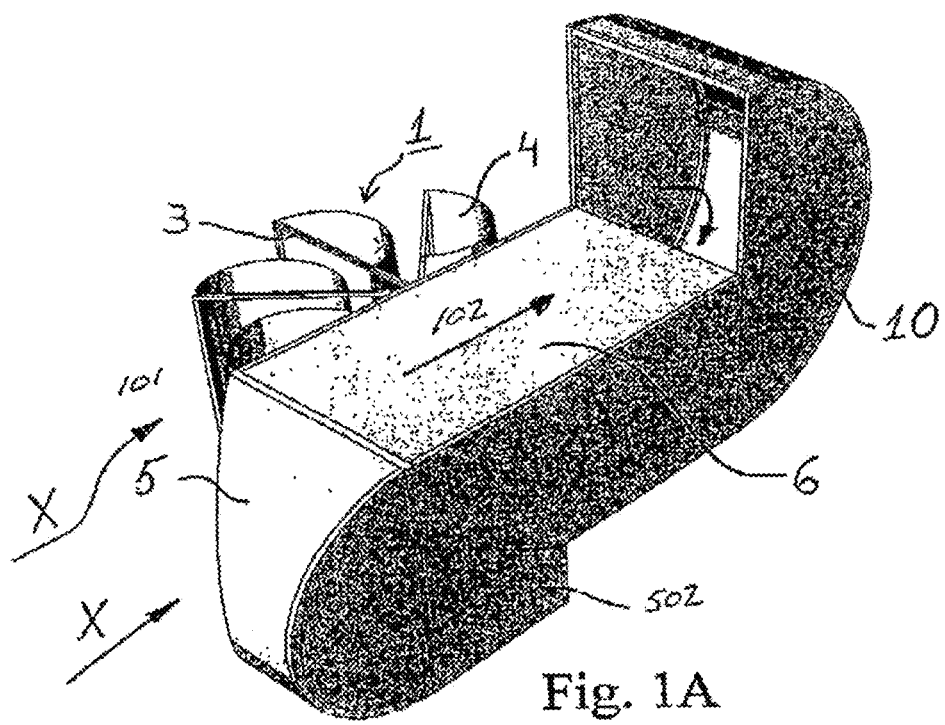
FIG. 1A illustrates vertical turbine system in front view, as an axonometric drawing.
Figure 1B:
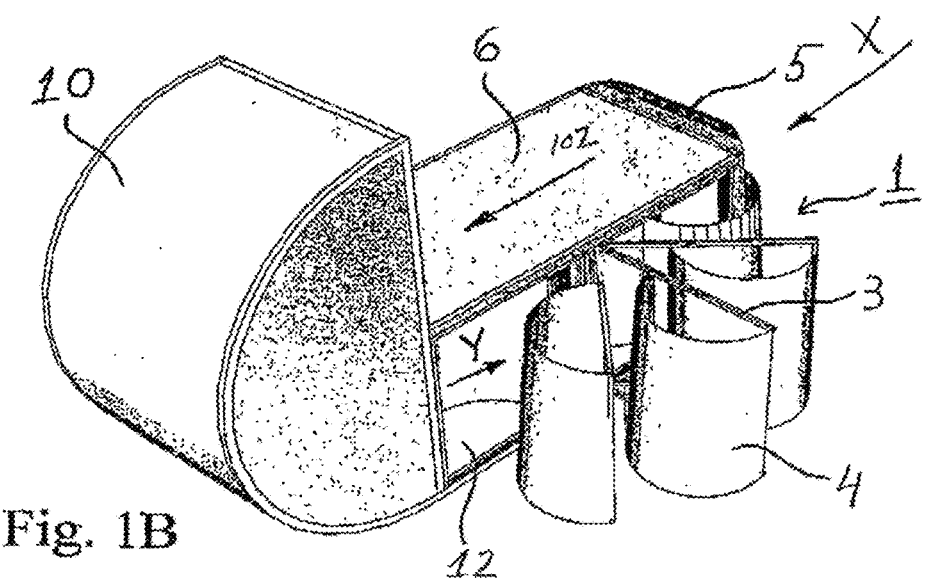
FIG. 1B illustrates vertical turbine system from the rear, as an axonometric drawing.
Figure 2:
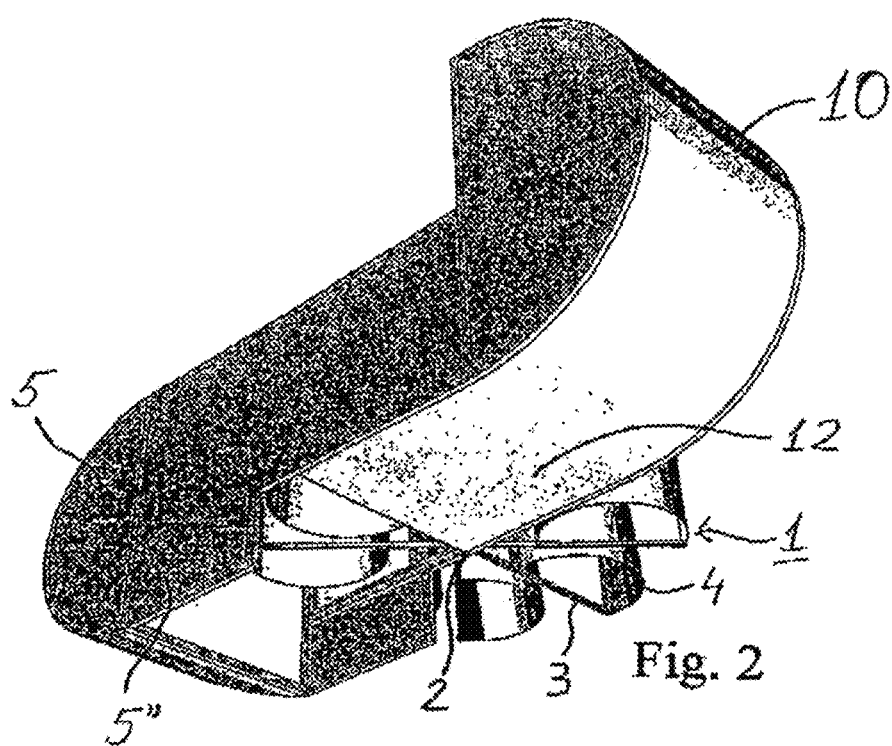
FIG. 2 illustrates vertical turbine system by view from beneath, where protrusion 12 and the lower cover 501 with its lower side walls 502 are particularly clearly seen.
Figure 3:
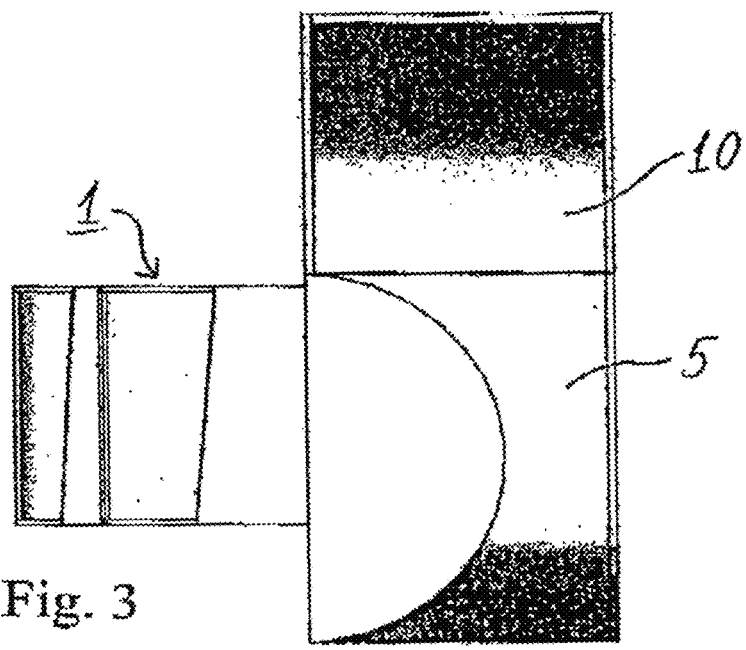
FIG. 3 illustrates vertical turbine system view frontally.
Figure 4:
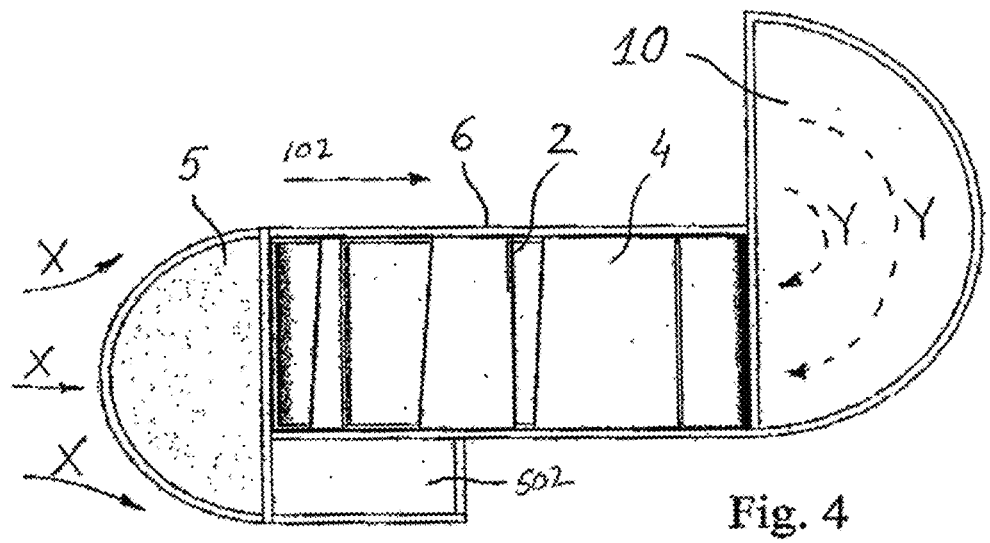
FIG. 4 illustrates vertical turbine system by view from the sides, where, for demonstrative interests, the side cover is removed in order to reveal turbine 1 with the blades 4.
Figure 5:
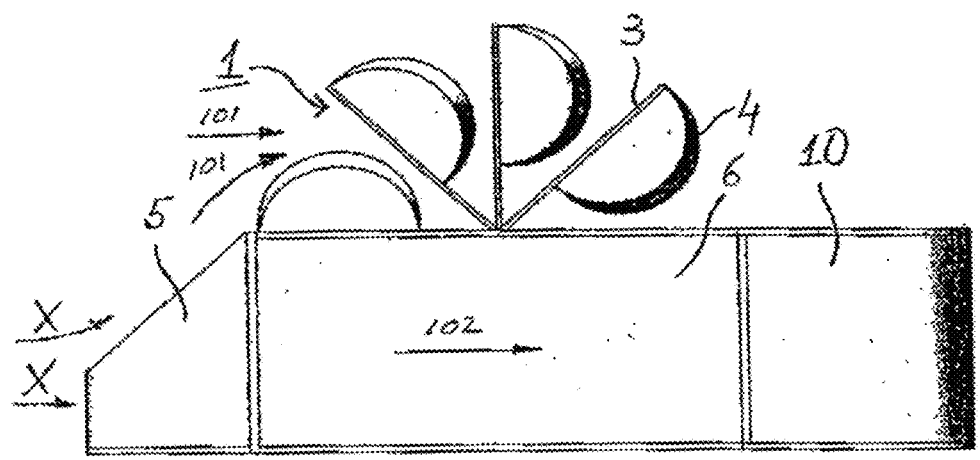
FIG. 5 illustrates vertical turbine system by view from above.

As it can be seen from FIG. 1A to FIG. 5, the vertical wind turbine system comprises a vertical wind turbine 1. The turbine 1 comprises a vertical axis, on which rotor 3 with blades 4 is installed, which are suitable as captors of fluid flow. Turbine system comprises a frontal fluid flow diverter 5 for diverting of the main fluid flow X and a cover 6 for covering of the upper part of the turbine 1. Characteristic of the turbine system is that it further comprises a rear fluid flow diverter 10 for the capture of fluid flow 102 running above the cover 6 to divert it to the wind turbine 1, creating a secondary fluid flow Y. Thus, the secondary fluid flow Y is created, which moves counter to the main fluid flow X, as well as counter to side fluid flow 101. In the indicated variant, air is used as the fluid.

Figure 6:
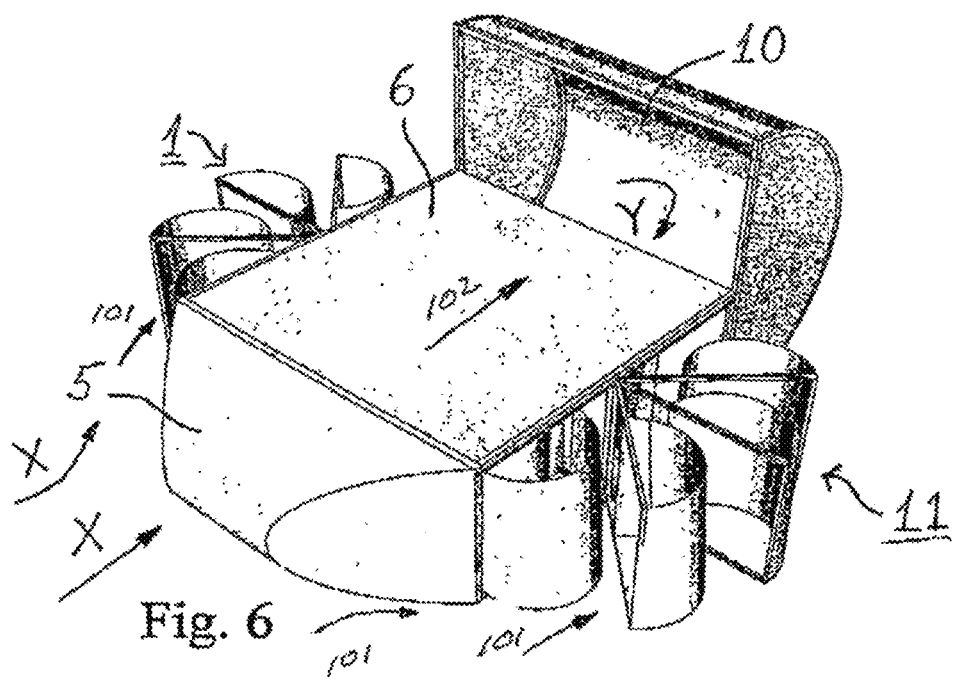
FIG. 6 illustrates vertical turbine system characterized by two paired turbines.

A vertical turbine system is illustrated in FIG. 6, FIG. 10 and FIG. 12, characterized in that system includes the single turbine 1 and a second, parallel, turbine 11. The presented system of vertical turbines comprises two paired vertical turbines 1, 11. Each turbine 1, 11 contains a vertical axis 2, onto which rotor 3 with blades 4 is installed, which are suitable for the capture of fluid flow. The system of turbines comprises a frontal fluid flow diverter 5 for diverting of the main fluid flow X, al id cover 6 for covering of the upper part of the turbines 1, 11. Additionally, the system of turbines comprises a rear fluid flow diverter 10 for the capture of fluid flow 102 running above the cover 6 and its diverting to the turbines 1, 11, creating a secondary fluid flow Y. Thus, the secondary fluid flow Y is created, which moves parallel to the main fluid flow X as well as parallel to the side fluid flow 101.

The frontal fluid flow diverter 5 is situated on the frontal part of both turbines 1, 11 and partly covers each of the turbines 1, 11. Thus, the field between the turbine axes 2 is covered. Remaining uncovered are blades 4 of both turbines 1, 11 situated on the outer edges of both turbines, which are influenced by the side fluid flow 101. Frontal fluid flow diverter 5 is configured so as to divide the indicated main fluid flow X into several fluid flows: into two proportional side fluid flows 101, fluid flow 102 running above the cover 6, and fluid flow 103 running underneath.

Figure 7A:
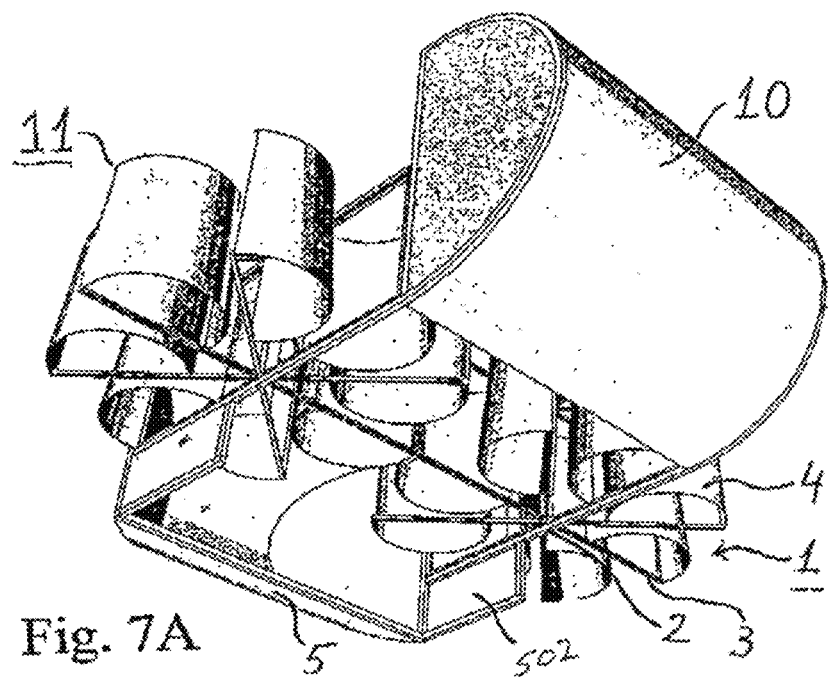
FIG. 7A illustrates system of vertical turbines by view from beneath.
Figure 7B:
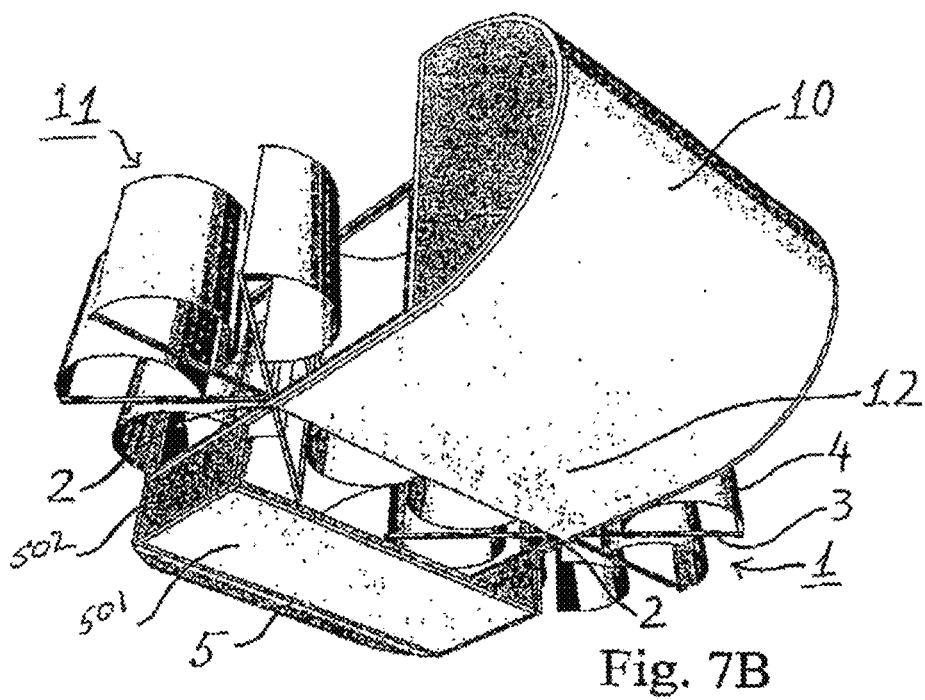
FIG. 7B illustrates system of vertical turbines by view from beneath where protrusion 12 and the lower cover 501 with its lower side walls 502 are particularly well visible.

System of vertical turbines can be supplemented with additional covers 501 and protrusions 12, as it can be seen in FIG. 7B. In FIG. 7A, a system of vertical turbines is illustrated, which is devoid of covers in its lower part. An embodiment is possible (FIG. 7B), in which the previously described solution is supplemented with protrusion 12. The indicated protrusion extends to the axes 2 of the turbines 1, 11, covering a part of the lower parts of the system. The system is further furnished with a lower cover 502 of the fluid flow diverter 5, which partly covers the lower part of the system as well. Besides, there are lower side walls 501 installed on the sides of the lower cover 502.

Figure 8:
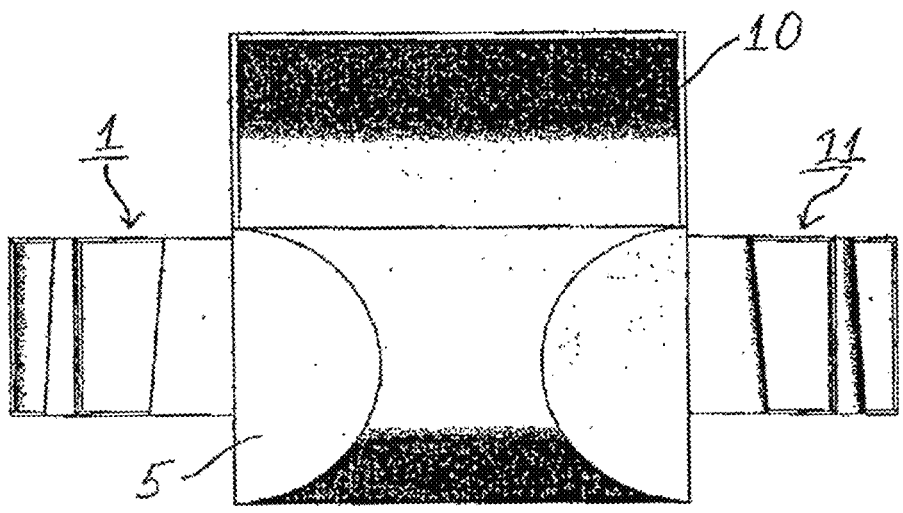
FIG. 8 illustrates system of vertical turbines in frontal view.
Figure 11:
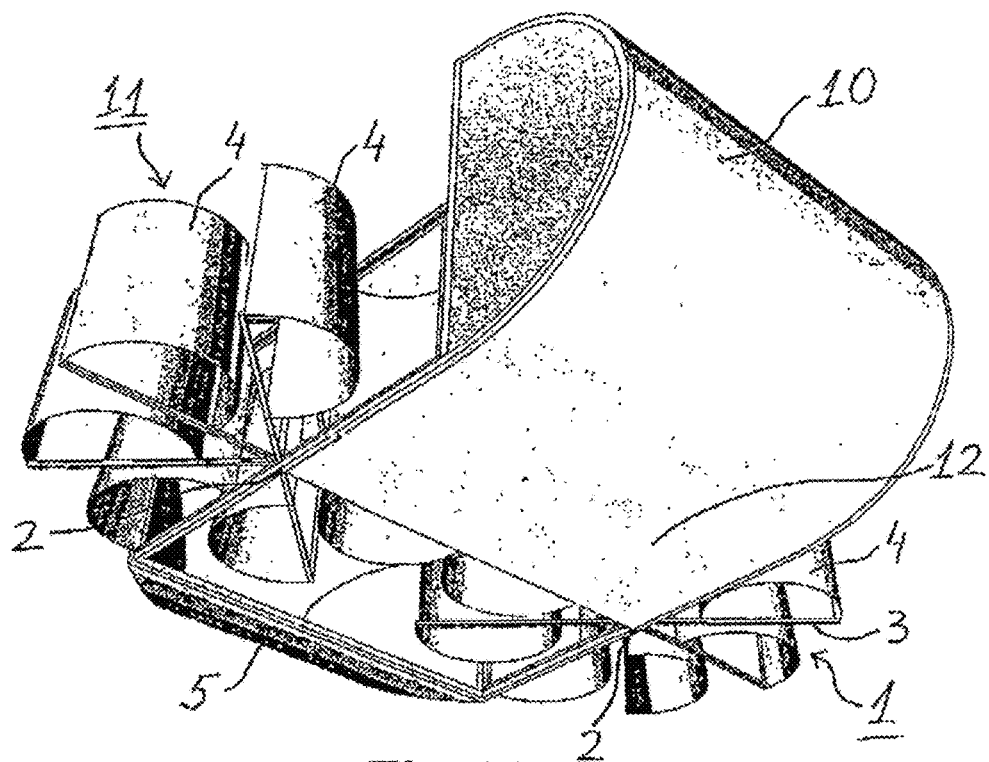
FIG. 11 illustrates an embodiment of vertical turbine system, in which the frontal fluid flow diverter 5 covers the front part of turbines 1 between their axes and only from their top to the ground. The frontal air flow diverter 5 does not protrude beneath the plane of the lower part of wind turbines.

In FIG. 8 and FIG. 9, a system of vertical turbines is illustrated, in which the frontal fluid flow diverter 5 is further protruded downwards, creating a different circulation of fluid flow in the lower part of the system.

Skilled persons can change and modify the concrete design of details without departure from the meaning of the following claims.

The invention claimed is:

1. A vertical turbine system comprising:
    a vertical axis turbine including a rotor, and wherein the rotor includes covered and uncovered blades for capturing fluid flows,
    a cover installed above the vertical axis turbine at least partly covering the vertical axis turbine from above,
    a frontal fluid flow diverter installed in front of the vertical axis turbine and partly covering the vertical axis turbine, wherein the frontal fluid flow diverter diverts a main fluid flow to right and left sides of the vertical turbine system, to the uncovered blades of the vertical axis turbine, to a location above the cover, and to a location underneath the vertical axis turbine,
    wherein the vertical turbine system further includes a rear fluid flow diverter, and wherein the rear fluid flow diverter is installed behind the vertical axis turbine and configured so as to divert the main fluid flow above the cover to a rear part of the vertical axis turbine in relation to the main fluid flow, creating a secondary fluid flow on the covered blades of the vertical axis turbine, wherein the secondary fluid flow flows parallel to a direction of rotation of the covered blades and counter to the main fluid flow,
    wherein the frontal fluid flow diverter has a downwardly extending portion including auxiliary lower side walls and a lower cover for downwardly diverting the secondary fluid flow and for thereby causing the secondary fluid flow to run out from the vertical turbine system.

2. The vertical turbine system according to claim 1, wherein the rear fluid flow diverter includes a lower part, and wherein the lower part of the fluid flow diverter includes a protrusion which extends under the vertical axis turbine, at least partly covering the vertical axis turbine.

3. A vertical turbine system having two paired vertical axis turbines, said system comprising:
    a cover which is installed above the vertical axis turbines, at least partly covering the vertical axis turbines from above,
    a frontal fluid flow diverter installed on a front part of both vertical axis turbines and partly covering each of said vertical axis turbines for diverting a main fluid flow, wherein the frontal fluid flow diverter diverts said main fluid flow to left and right sides of the vertical turbine system, to uncovered blades of the vertical axis turbines, to a location above the cover, and to a location underneath both of the vertical axis turbines,
    wherein the vertical turbine system includes a rear fluid flow diverter installed behind both of the vertical axis turbines and configured so as to divert the main fluid flow above the cover to a rear part of each of the vertical axis turbines in relation to the main fluid flow, creating a secondary fluid flow on covered blades of the vertical axis turbines, wherein the secondary fluid flow flows parallel to a direction of rotation of the covered blades and counter to the main fluid flow,
    wherein the frontal fluid flow diverter has a downwardly extending portion including auxiliary lower side walls and a lower cover for downwardly diverting the secondary fluid flow, and for thereby causing the secondary fluid flow to run out from the vertical turbine system.

4. The vertical turbine system according to claim 3, wherein the frontal fluid flow diverter is configured so as to cover a zone between the vertical axes of both vertical axis turbines, in order for the main fluid flow to be diverted to blades on left and right sides of the vertical turbine system, creating a side fluid flow on each side.

5. The vertical turbine system according to claim 3, wherein the rear fluid flow diverter includes a lower part, and wherein the lower part of the rear fluid flow diverter includes a protrusion which extends under both of the vertical axis turbines, at least partly covering the vertical axis turbines.

* * * * *